(12) United States Patent
Smith

(10) Patent No.: US 6,763,546 B1
(45) Date of Patent: Jul. 20, 2004

(54) SELF-CONTAINED AUTOMATIC WINDSHIELD MAINTENANCE SYSTEM

(76) Inventor: Mark A. Smith, 211 Serenity Hills PL SE, Albuquerque, NM (US) 87123

( * ) Notice: Subject to any disclaimer, the term of this patent is extended or adjusted under 35 U.S.C. 154(b) by 0 days.

(21) Appl. No.: 10/375,704

(22) Filed: Feb. 26, 2003

(51) Int. Cl.$^7$ .............................. B60S 1/28; B60S 1/46
(52) U.S. Cl. ................ 15/250.04; 15/240.4; 15/250.41
(58) Field of Search .................... 15/250.04, 250.4, 15/250.41, 250.361, 250.48

(56) References Cited

U.S. PATENT DOCUMENTS

| | | | | |
|---|---|---|---|---|
| 4,719,661 A | * | 1/1988 | Hanselmann | 15/250.203 |
| 5,168,595 A | * | 12/1992 | Naylor, Jr. | 15/250.4 |
| 5,301,384 A | * | 4/1994 | Perry | 15/250.4 |
| 5,442,834 A | * | 8/1995 | Perry | 15/250.4 |
| 5,778,483 A | * | 7/1998 | Dawson | 15/250.04 |
| 5,802,661 A | * | 9/1998 | Miller et al. | 15/250.41 |

FOREIGN PATENT DOCUMENTS

| | | | | |
|---|---|---|---|---|
| DE | 3934203 | * | 4/1991 | 15/250.4 |
| WO | 8001155 | * | 6/1980 | 15/250.4 |

* cited by examiner

*Primary Examiner*—Gary K. Graham
(74) *Attorney, Agent, or Firm*—Donald W. Meeker

(57) ABSTRACT

A complete self-contained automatic windshield maintenance system comprising a conventional windshield wiper blade with a scrubber blade and washer, and a conventional wiper blade with a scraper, wherein the system automatically switches between the conventional blade and the view obscuring debris-removing blade with each stroke of the wiper arm. The complete self-contained automatic windshield system is further equipped with a remote control device.

5 Claims, 2 Drawing Sheets

SELF-CONTAINED AUTOMATIC WINDSHIELD MAINTENANCE SYSTEM

BACKGROUND OF THE INVENTION

1. Field of the Invention

The present invention relates to windshield wipers and in particular to a complete self-contained automatic windshield maintenance system comprising a conventional windshield wiper blade, a scrubber blade, a washer sprayer, and a scraper blade, wherein the system automatically switches between the conventional blade and either the scrubber blade and washer or the scraper with each stroke of the wiper arm.

2. Description of the Prior Art

Having a clean windshield is of primary importance in driving a vehicle. Even slight films on the windshield not immediately visible can completely obscure the view of the driver when sunlight creates a glare due to the film. Rain, dirt, ice, snow and other outdoor factors pose constant dangers to the view of a driver of a vehicle.

While it is possible to manually clean a windshield before entering a vehicle to drive, very often the view-obscuring problems occur while actually driving on the road. Very often a conventional rubber blade windshield wiper and conventional windshield squirter with water/cleaning fluid coming from the hood of the vehicle are not adequate for keeping the windshield clear.

In icy conditions there is a need for a scraper to loosen thin sheets of ice with the assistance of a cleaning fluid containing anti-freeze to scrape the ice and break it free of the windshield and then a conventional wiper blade to wipe the loosened debris clear of the windshield in an alternating pattern. Similarly with dirt and other debris, there is a need for a scrubber blade to work with a cleaning fluid to scrub the debris and loosen it from the windshield and an alternating conventional blade to wipe the windshield free of the loosened debris.

Several patents have windshield wipers combined with scrapers and/or scrubbers, which can alternate between the wiper and the scrubber and/or scraper.

U.S. Pat. No. 4,719,661, issued Jan. 19, 1988 to Hanselmann, indicates a windshield wiper assembly that, in addition to carrying the wiper blade, also carries an additional cleaning device which may be a brush, an ice scraper, or an additional blade through which washer fluid may be sprayed. The additional device is coupled with the wiper arm-and-blade assembly by means of a coupling which may be operated by an adjusting element. The additional part is only used, when it is really necessary and, in addition, serves to reduce pressure on the wiper arm-and-blade assembly in the parking position. This patent claims an electromagnet for displacing the tappet that controls the wiper arms.

U.S. Pat. No. 4,016,623, issued Apr. 12, 1977 to Nixdorf, provides a windshield cleaning device for motor vehicles for use in conjunction with a reciprocable wiper blade, having an essentially trough-shaped receptacle with an inner chamber that is open on at least one side for the accommodation of a water-soluble paste or solid cleansing agent and/or detergent concentrate, mounting means projecting from the receptacle at the side facing away from the at least one open side of the inner chamber for the releasable attachment of the device to one side of the wiper blade, and an applicator disposed adjacent a straight edge defining the inner chamber of the receptacle, which receives from the inner chamber the cleansing agent and/or detergent dissolved by water and applies it to the windshield wiped by the wiper blade. The device is so mounted on the wiper blade that the applicator effectively lies upon the windshield when the receptacle and applicator precede the wiper blade in the direction of movement, and is lifted away from the windshield when the wiper blade is moved in the opposite direction.

U.S. Pat. No. 5,301,384, issued Apr. 12, 1994 to Perry, shows a vehicular window cleaning apparatus having a wiper arm, wiper blade and drive means therefor in combination with a scrubber for intensifying the cleaning effort of the wiper blade. The scrubber is detachably connected to the wiper blade. An adjustment means is provided for rotating the wiper blade relative to the wiper arm for selectively and sequentially positioning the wiper blade and scrubber against an associated windshield.

U.S. Pat. No. 5,235,720, issued Aug. 17, 1993 to Kinder, claims a windshield scrubbing and wiping blade assembly including a scrubbing blade having a mesh covered scrubbing portion and at least one wiping blade in parallel, spaced apart relationship with the scrubbing blade. The mesh and the associated scrubbing portion of the scrubbing blade define side channels for receiving and transporting debris removed by the mesh from the windshield. In the two bladed embodiment of the invention, the scrubbing blade is shorter than the wiping blade whereby the scrubbing blade is maintained out of contact with the windshield during the portion of the wiping cycle in which the scrubbing blade trails the wiping blade. The mesh has edge margins which, in accordance with one embodiment, are beaded. The beads thus provided are received by and mechanically locked within longitudinally extending bores formed in the scrubber blade thereby avoiding the use of adhesives for securing the mesh to the scrubbing blade.

U.S. Pat. No. 5,168,595, issued Dec. 8, 1992 to Naylor, Jr., describes a windshield wiper assembly for use with a driven wiper arm for cleaning a windshield comprising a wiper blade arm assembly adapted to be mounted to the driven wiper arm and including an elongated support-frame, an elongated blade carrier pivotally mounted to the support frame, and first and second blades mounted to the blade carrier. Means are provided for pivoting the blade carrier between a first position in which the first blade is positioned for contacting the windshield and the second blade is positioned to be spaced from the windshield and a second position in which the first blade is positioned to be spaced from the windshield and the second blade is positioned for contacting the windshield. By making the blades of different compositions, different cleaning tasks can be effectively accomplished, as for example removing ice or insects. Alternatively, a wiper blade comprises two sections made of different materials.

U.S. Pat. No. 5,442,834, issued Aug. 22, 1995 to Perry, discloses a vehicular window cleaning apparatus having a wiper arm, wiper blade and drive means therefor in combination with a scrubber for intensifying the cleaning effort of the wiper blade. The scrubber is detachably connected to the wiper blade. A cam means is provided for rotating the wiper blade relative to the wiper arm for selectively and sequentially locking the wiper arm and scrubber against an associated windshield.

U.S. Pat. No. 4,524,481, issued Jun. 25, 1985 to Koomen, puts forth a flexible wiper, having a body portion supporting a pair of opposed longitudinal slots for engaging a harness of a wiper arm, including a pair of parallel spaced apart blades depending from the body portion for operating in concert to wipe a surface. A cavity extending throughout the body portion is disposed intermediate the pair of blades and is defined in part by a flexible membrane interconnecting facing sides at the bases of the blades.

U.S. Pat. No. 4,736,485, issued Apr. 12, 1988 to Egner-Walter, et al., concerns a windshield wiper system in which, in order to relieve the wiper lip in the parking position of the windshield wiper, a magnet becomes effective whose force is without contact opposed to the contact pressure which in known manner is produced for example by a tension spring between fastening member and link of the wiper arm.

U.S. Pat. No. 5,802,661, issued Aug. 8, 1998 to Miller, et al., illustrates a wiper blade assembly including a housing, two blades, two blade support structures, and a switching mechanism. The housing includes a shell having two longitudinal channels. The housing further includes a lower opening and a bottom plate sized to cover the lower opening. The bottom plate is releasably connected to the shell and includes two slots. An inner seal attaches to an interior surface of the bottom plate and includes slots that align with the bottom plate slots. The blades and blade support structures are positioned within the housing channels and are aligned with the bottom plate slots. Each support structure includes a middle portion having a transverse central hole. The switching mechanism includes a shaft and first and second cams attached to the shaft. The first cam is held within the transverse hole of the first support structure and the second cam is held within the transverse hole of the second support structure. During use, the switching mechanism causes at least one blade to extend through its respective slot and at least one blade to be retracted within the housing.

U.S. Pat. No. 5,335,393, issued Aug. 9, 1994 to Charng, is for a dual wiper blade assembly for mounting on the end of a wiper arm and engaging a windshield, which has an elongated main yoke generally pivoted at a transverse central pivot on the wiper arm and having a pair of outer ends spaced longitudinally outward from the pivot, respective one-piece secondary yokes pivoted at outer axes on the outer ends of the main yoke and having inner and outer ends, and respective inner and outer mounts on the secondary-yoke ends for carrying a pair of parallel and transversely spaced wiper blades engageable against a windshield.

What is needed is a combined alternating system with a conventional wiper blade for wiping water and loose debris and a stronger debris loosening blade such as a combination windshield scrubber and washer or a windshield scraper which can switch back and forth from the conventional blade to the obstacle removing blade in each back and forth motion of the wiper arm.

SUMMARY OF THE INVENTION

An object of the present invention is to provide a self-contained windshield maintenance system which can switch back and forth from the conventional blade to the obstacle removing blade in each back and forth motion of the wiper arm.

Another object of the present invention is to provide a far superior method of maintaining a clear line of vision than the conventional method currently in use on today's motor vehicles.

Yet another object of the present invention is to provide a scraper to loosen thin sheets of ice with the assistance of a cleaning fluid containing anti-freeze to scrape the ice and break it free of the windshield and then a conventional wiper blade to wipe the loosened debris clear of the windshield in an alternating pattern.

An ensuing object of the present invention is to provide an optional scraping device for winter months that can be swapped into place, to aid with the removal of frost and minor ice build up, or built into a combination blade with all three.

One more object of the present invention is to provide a scrubber blade to work with a cleaning fluid to scrub the debris and loosen it from the windshield and an alternating conventional blade to wipe the windshield free of the loosened debris.

An additional object of the present invention is to provide an entire package that will be no larger than a standard dual bladed system seen on many of today's vehicles.

A further object of the present invention is to provide a self-contained windshield maintenance system that would be mounted on a standard wiper arm and concealed under a contoured cover that not only protects the components from the elements but also adds to the esthetics of the vehicle.

A contributory object of the present invention is to provide a remote control device for the self-contained windshield maintenance system.

An added object of the present invention is to provide a smooth alternating motion by mounting bearings on either side of the sprayer bar and attaching the support bracket with the electromagnet assembly to them.

An ancillary object of the present invention is to provide a "powermode" in which the high flow pump located at the bottom of a reservoir would activate sending the flow of cleaning fluid to the nozzles giving the same effect as a car wash sprayer.

In brief, a self-contained windshield maintenance system implements the use of interchangeable devices that provide a far superior method of maintaining a clear line of vision than the conventional method currently in use on today's motor vehicles.

The basic system consists of a scrubbing pad used for temperate conditions to aid with the loosening and removal of insects and other debris that accumulate on the windshield and hampers the vision of both the operator and the passengers of the vehicle. During the winter months an optional scraping device can be swapped into place to aid with the removal of frost and minor ice build up or built into a combination blade with all three. Located between the scrubber and the wiper blade is a sprayer bar designed to output a high pressure stream through a series of nozzles. The entire package will be no larger than a standard dual bladed system seen on many of today's vehicles and would be mounted on a standard wiper arm and concealed under a contoured cover that not only protects the components from the elements but adds to the esthetics of the vehicle.

Actuation of the mechanism would be the same as seen in today's vehicles and in most instances this is via a switch mounted on a lever found on the steering column. There are two modes of operation, one being the normal mode where only the wiper blade is utilized. By depressing a button the second mode a "powermode" would be activated causing the wiper assembly to toggle between the wiper and the scrubber attachment or between the wiper and the scraper attachment. Also in the powermode the high flow pump located at the bottom of a reservoir with a capacity of greater than one gallon would activate sending the flow of cleaning fluid to the nozzles giving the same effect as a car wash sprayer. On the upward stroke of the wiper arm, two mini electromagnets located on either side of the mounting bracket would energize, which in turn would cause the bracket to tilt ~5° for the scrub pad or scraping blade to make contact and raise the wiper blade. On the downward stroke the magnets would de-energize allowing the spring-loaded mount to return to its home position. The toggling between wiper and scrubber would time out in about 15 seconds.

The present invention can achieve a smooth alternating motion by mounting bearings on either side of the sprayer bar and attaching the support bracket with the electromagnet assembly to them. The spray bar would be hard mounted on the wiper arm with the water inlet located on the back and in the center of the bar.

An advantage of the present invention is in providing a self-contained windshield maintenance system that can switch back and forth from the conventional blade to the obstacle removing blade in each back and forth motion of the wiper arm.

Another advantage of the present invention is that it provides a far superior method of maintaining a clear line of vision than the conventional method currently in use on today's motor vehicles.

Yet another advantage of the present invention is in providing a scraper to loosen thin sheets of ice with the assistance of a cleaning fluid containing anti-freeze to scrape the ice and break it free of the windshield.

Still another advantage of the present invention is in the provision of an optional scraping device for winter months that can be swapped into place, to aid with the removal of frost and minor ice build up, or built into a combination blade with all three.

One more advantage of the present invention is that it provides a scrubber blade to work with a cleaning fluid to scrub the debris and loosen it from the windshield and an alternating conventional blade to wipe the windshield free of the loosened debris.

An additional advantage of the present invention is that the entire package that will be no larger than a standard dual bladed system seen on many of today's vehicles.

A further advantage of the present invention is that it would be mounted on a standard wiper arm and concealed under a contoured cover that not only protects the components from the elements but also adds to the esthetics of the vehicle.

One more advantage of the present invention is that it provides a remote control device for the self-contained windshield maintenance system.

An added advantage of the present invention is that it provides a smooth alternating motion by mounting bearings on either side of the sprayer bar and attaching the support bracket with the electromagnet assembly to them.

Another advantage of the present invention is in providing a "powermode" in which the high flow pump located at the bottom of a reservoir would activate sending the flow of cleaning fluid to the nozzles giving the same effect as a car wash sprayer.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
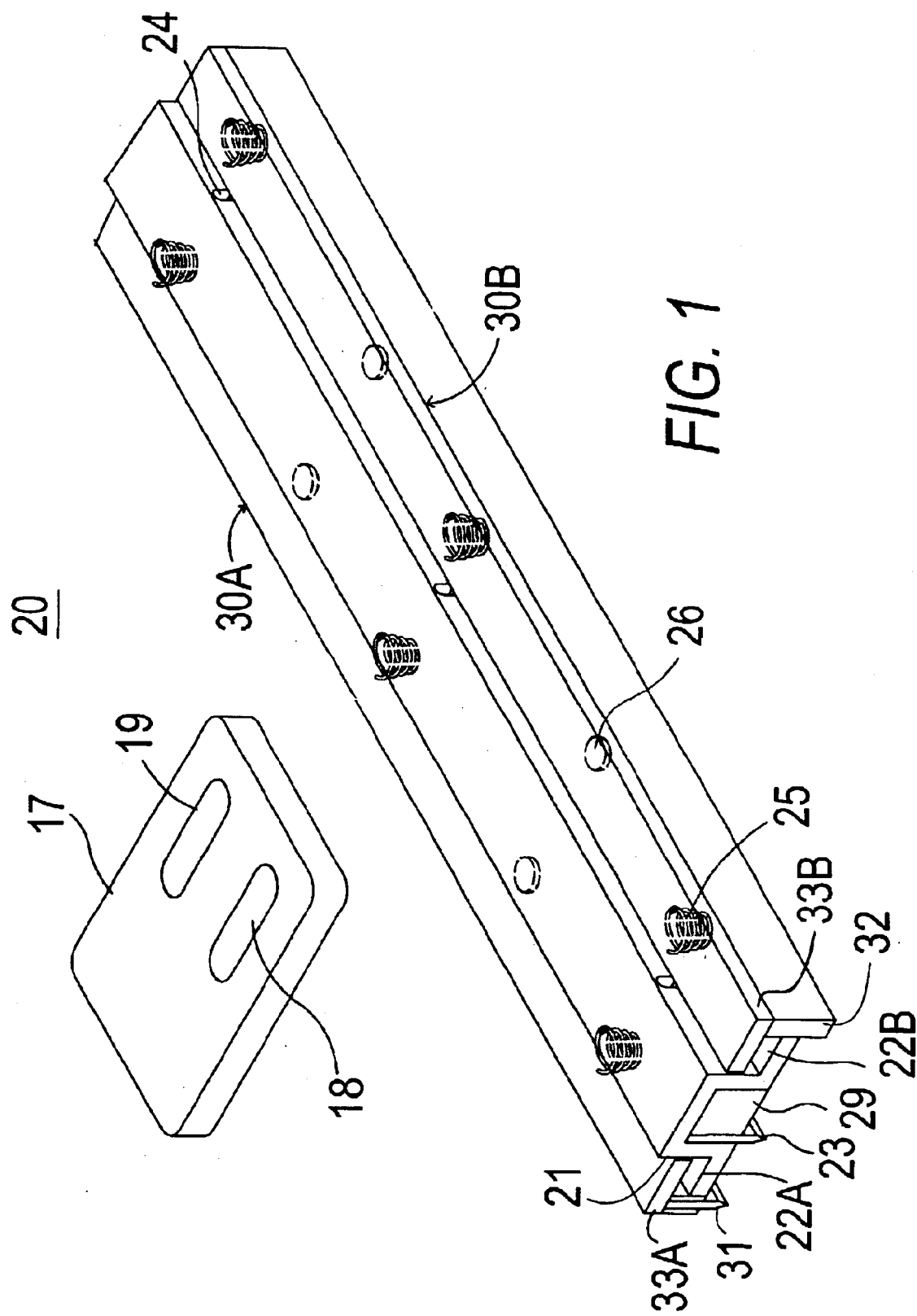
FIG. 1 is a perspective view showing the assembled combination blade of the present invention and the remote control switch for operating the blade.
Figure 2:
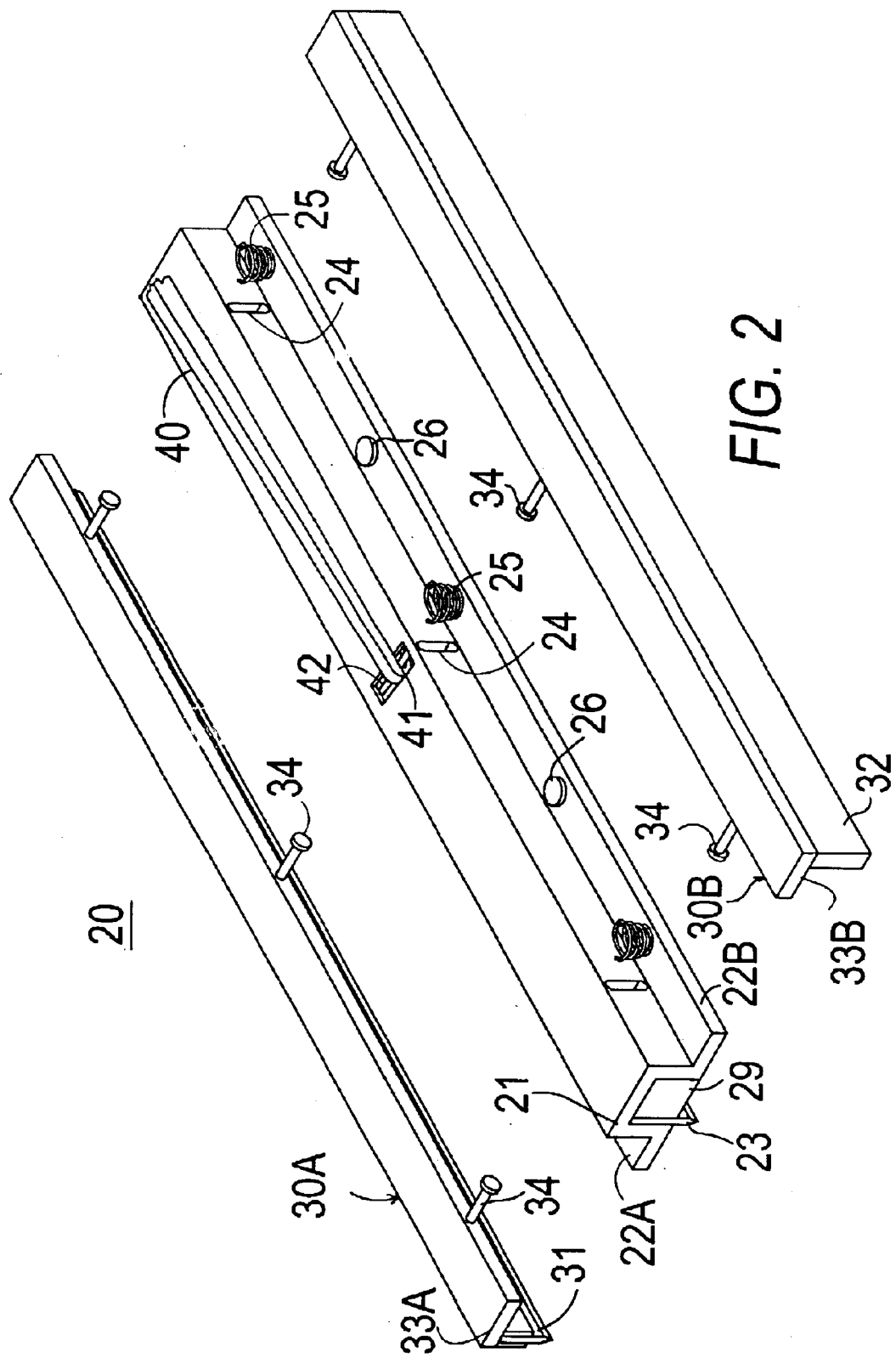
FIG. 2 is an exploded perspective view showing the two side power arms aligned for connection to the central wiper arm with the wiper blade and the squirter.

In FIGS. 1 and 2, a self-contained automated windshield maintenance system 20 comprises a primary wiper arm 21, a scraper arm 30A and a scrubber arm 30B with the wiper arm 21 attached by a pin 42 to a standard hook 41 on a pivoting arm 40 of a windshield wiper system.

The primary wiper arm 21 comprises a longitudinal housing 21 retaining within the housing 21 a conventional type windshield wiper blade 23 and a windshield squirter 29 running the length of the housing 21 and facing away from the housing 21 toward a windshield of a vehicle. The wiper blade 23 would normally be in contact with the windshield. The housing 21 further comprising at least two transverse slots 24 on each of two sides along the length of the housing 21 and an orthogonal protruding shelf 22A, 22B running the length of each side of the housing 21. Each of the shelves 22A, 22B has at least two electromagnets 26 and at least two springs 25 along a portion of the each of the protruding shelves 22A, 22B facing away from the windshield.

The scraper arm 30A comprises an elongated scraper support arm 33A configured to align with one of the shelves 22A of the housing 21 and having at least two protruding arms 34, each with an attached bushing capable of riding in one of the transverse slots 24 of the housing 21. The scraper arm 30A having metallic elements mounted opposite the electromagnets 26 for means of magnetic attraction to the electromagnets 26 or having the entire scraper arm fabricated of metal with magnetic attraction characteristics. The scraper arm 30A is attached to the at least two springs 25 which are capable of maintaining the scraper arm 30A in a first position normally away from the windshield, with the wiper blade 23 in contact with the windshield. The scraper arm 30A further comprising a scraping blade 31 attached lengthwise to the scraper support arm 33A, which is normally positioned away from the windshield. The scraping blade 31 being capable of scraping objects from the windshield with the scraper arm 30A in a second position of the scraping blade 31 being in contact with the windshield when the electromagnets 26 pull the scraper arm toward the windshield. The scraping blade 31 comprises an elongated hard plastic blade with a sharp edge along its entire length, the scraping blade 31 being capable of scraping frozen winter deposits from the windshield.

The scrubber arm 30B comprises an elongated scrubber support arm 33B configured to align with the other of the shelves 22B of the housing 21 and having at least two protruding arms 34 each with an attached bushing capable of riding in one of the transverse slots 24 of the housing 21. The scrubber arm 30B has metallic elements mounted opposite the magnets 26 for means of magnetic attraction to the at least two electromagnets 26, or the scrubber arm is fabricated of a metal having magnetic attraction characteristics. The scrubber arm 30B is attached to the springs 25 which are capable of maintaining the scrubber arm 30B in a first position normally away from the windshield, with the wiper blade 23 in contact with the windshield. The scrubber arm 30B further comprising a scrubbing blade 32 attached lengthwise to the scrubber support arm 33B. The scrubbing blade 32 comprises an elongated flexible rubberized blade having a textured coating capable of loosening debris stuck to the windshield. The scrubbing blade 32 is normally positioned away from the windshield. The scrubbing blade 32 being capable of scrubbing objects from the windshield with the scrubber arm 30B in a second position of the scrubbing blade 32 in contact with the windshield with the scrubber arm pulled down toward the windshield by the electromagnets 26.

A programmed remote control 17 is positioned in communication with a driver of the vehicle, the remote control 17 being capable of activating one of two power modes of the windshield maintenance system 20 wherein a first power mode 18 activates the at least two electromagnets 26 in an alternating on/off schedule for a programmed period of time on one side of the housing 22A alternately attracting the scraper arm 30A to cause the scraper blade 31 to contact the windshield and thereby lift the wiper blade 23 off of the windshield and simultaneously activate the squirter 29 to squirt antifreeze on the windshield on a stroke of the wiper arm 40 in one direction and deactivating the squirter 29 and the at least two electromagnets 26 to release the scraper arm 30A and move the scraping blade 31 away from the windshield to cause the wiper blade 23 to engage the windshield on a stroke of the wiper arm 40 in the other direction. A second power mode 19 activates the at least two electromagnets 26 in an alternating on/off schedule for a programmed period of time on the other side of the housing 22B alternately attracting the scrubber arm 30B to cause the scrubbing blade 32 to contact the windshield and thereby lift the wiper blade 23 off of the windshield and simultaneously activate the squirter 29 to squirt cleaning liquid on the windshield on a stroke of the wiper arm 40 in one direction and deactivating the squirter 29 and the at least two electromagnets 26 to release the scrubber arm 30B and move the scrubbing blade 32 away from the windshield to cause the wiper blade 23 to engage the windshield on a stroke of the wiper 40 in the other direction.

It is understood that the preceding description is given merely by way of illustration and not in limitation of the invention and that various modifications may be made thereto without departing from the spirit of the invention as claimed.

What is claimed is:

1. A self-contained automated windshield maintenance system comprising:

a primary wiper arm comprising a longitudinal housing retaining within the housing a windshield wiper blade and a windshield squirter running the length of the housing and facing away from the housing toward a windshield of a vehicle, the wiper blade normally being in contact with the windshield, the housing further comprising at least two transverse slots on each of two sides along the length of the housing and an orthogonal protruding shelf on each side of the housing along the length of the housing, each of the shelves having at least two electromagnets and at least two springs along a portion of the each of the protruding shelves facing away from the windshield;

a scraper arm having an elongated scraper support arm configured to align with one of the shelves of the housing and having at least two protruding arms each with an attached bushing capable of riding in one of the transverse slots of the housing and having a means for magnetic attraction to the at least two electromagnets, the scraper arm being attached to the at least two springs which are capable of maintaining the scraper arm in a first position normally away from the windshield with the wiper blade in contact with the windshield, the scraper arm further comprising a scraping blade attached to the scraper support arm along the length of the scraper support arm, the scraping blade normally positioned away from the windshield, the scraping blade being capable of scraping objects from the windshield with the scraper arm in a second position with the scraping blade in contact with the windshield;

a scrubber arm having an elongated scrubber support arm configured to align with the other of the shelves of the housing and having at least two protruding arms each with an attached bushing capable of riding in one of the transverse slots of the housing and having a means for magnetic attraction to the at least two electromagnets, the scrubber arm being attached to the at least two springs which are capable of maintaining the scrubber arm an a first position normally away from the windshield with the wiper blade in contact with the windshield, the scrubber arm further comprising a scrubbing blade attached to the scrubber support arm along the length of the scrubber support arm, the scrubbing blade normally positioned away from the windshield, the scrubbing blade being capable of scrubbing objects from the windshield with the scrubber arm in a second position with the scrubbing blade in contact with the windshield;

a programmed remote control means positioned in communication with a driver of the vehicle, the remote control being capable of activating one of two power modes of the windshield maintenance system wherein a first power mode activates the at least two electromagnets in an alternating on/off schedule for a programmed period of time on one side of the housing alternately attracting the scraper arm to cause the scraper blade to contact the windshield and thereby lift the wiper blade off of the windshield and simultaneously activate the squirter to squirt antifreeze on the windshield on a stroke of the wiper arm in one direction and deactivating the squirter and the at least two electromagnets to release the scraper arm and move the scraping blade away from the windshield to cause the wiper blade to engage the windshield on a stroke of the wiper arm in the other direction, and alternately in a second power mode activates the at least two electromagnets in an alternating on/off schedule for a programmed period of time on the other side of the housing alternately attracting the scrubber arm to cause the scrubbing blade to contact the windshield and thereby lift the wiper blade off of the windshield and simultaneously activate the squirter to squirt cleaning liquid on the windshield on a stroke of the wiper arm in one direction and deactivating the squirter and the at least two electromagnets to release the scrubber arm and move the scrubbing blade away from the windshield to cause the wiper blade to engage the windshield on a stroke of the wiper arm in the other direction.

2. The system of claim 1 wherein the means for magnetic attraction of the scraper support arm and the scrubber support arm comprises a metallic element attached to each of the arms opposite to the position of each of the electromagnets.

3. The system of claim 1 wherein the means for magnetic attraction of the scraper support arm and the scrubber support arm comprises each of the arms being fabricated of metal.

4. The system of claim 1 wherein the scraping blade comprises an elongated hard plastic blade with a sharp edge along its entire length, the scraping blade being capable of scraping frozen winter deposits from the windshield.

5. The system of claim 1 wherein the scrubbing blade comprises an elongated flexible rubberized blade having a textured coating capable of loosening debris stuck to the windshield.

* * * * *